Jan. 20, 1948.  L. C. BROOKS  2,434,756
HERMETICALLY SEALED CONTAINER AND METHOD OF MAKING THE SAME
Filed Oct. 23, 1942  7 Sheets-Sheet 1

Inventor
Lewis C. Brooks

Jan. 20, 1948. L. C. BROOKS 2,434,756
HERMETICALLY SEALED CONTAINER AND METHOD OF MAKING THE SAME
Filed Oct. 23, 1942 7 Sheets-Sheet 4

Inventor
Lewis C. Brooks

Jan. 20, 1948.  L. C. BROOKS  2,434,756
HERMETICALLY SEALED CONTAINER AND METHOD OF MAKING THE SAME
Filed Oct. 23, 1942   7 Sheets-Sheet 5

Exaggerated

Inventor
Lewis C. Brooks
By [signature]
Attorney

Jan. 20, 1948. L. C. BROOKS 2,434,756
HERMETICALLY SEALED CONTAINER AND METHOD OF MAKING THE SAME
Filed Oct. 23, 1942 7 Sheets-Sheet 6

Inventor
Lewis C. Brooks
By
Attorney

Jan. 20, 1948.　　　　L. C. BROOKS　　　　2,434,756
HERMETICALLY SEALED CONTAINER AND METHOD OF MAKING THE SAME
Filed Oct. 23, 1942　　　7 Sheets-Sheet 7

Inventor
Lewis C. Brooks

Patented Jan. 20, 1948

2,434,756

UNITED STATES PATENT OFFICE 2,434,756

HERMETICALLY SEALED CONTAINER AND METHOD OF MAKING THE SAME

Lewis C. Brooks, Madison, Wis., assignor of one-third to Ira Milton Jones, Mequon, Wis.

Application October 23, 1942, Serial No. 463,099

3 Claims. (Cl. 229—14)

This invention relates to containers made of fiber, plastics and any other flexible sheet material, for consumer goods and has as its object the provision of a container of this type which is hermetically sealed and suitable for use with any product.

More specifically, it is an object of this invention to provide a fiber container and a method of making the same, which is liquid-proof, oil and grease-proof, airtight, and sift-proof and at the same time is easy to open. In general these objectives are attained by lining the container with sheet material impervious to the product for which the container is intended.

While Cellophane and Pliofilm are admirably adapted for use in carrying out the objects of this invention as these materials are impervious to most products packaged in containers of this type, other materials may very well be used for the linings. Hence, where reference is made hereinafter to the lining material it is contemplated that any suitable material shall be included.

Merely laminating the walls of the container does not satisfy the requirements as this would not assure the provision of hermetically sealed junctures between the body and the end closures.

The essence of the present invention thus lies in so fabricating and assembling the body and end closures with each other and with the lining sheets that all surfaces exposed to the contents of the container and the junctures between the body and end closures are wholly and completely covered with the impervious lining, bearing in mind that the final closure and sealing of the container must be done after the container has been filled and that the container shall easily open.

It is also an object of this invention to provide a container of the character described wherein the outer lamination of one or more walls of the container has a movable flap portion which may be lifted to expose the inner lining so that upon puncturing of the inner lining the contents may be discharged while the movable flap portion serves as a cover to close the container after opening.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which.

Figure 2:
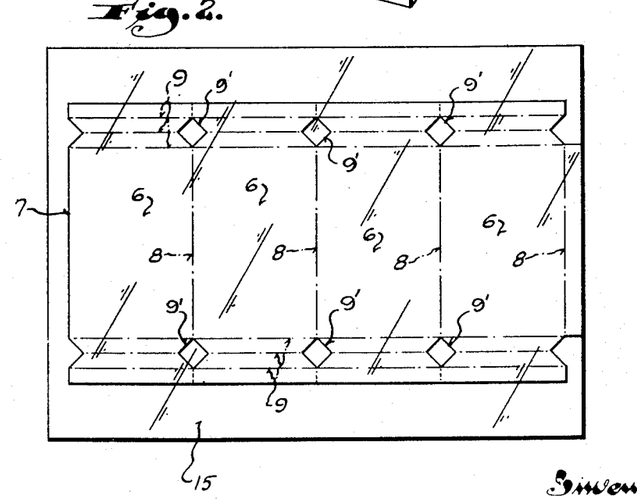
Figure 2 is a plan view of the blank from which the body of the container shown in Figure 1 is formed, and illustrating the lining sheet in position thereon preparatory to being adhered to the blank.

Referring now particularly to the accompanying drawings in which like numerals indicate like parts and wherein cross sectional views through the various junctures have wall thicknesses greatly exaggerated for clarity, the numeral 5 designates the body of a container, the side walls 6 of which are flat and formed from a single blank 7 shown in Figure 2.

This blank, as more particularly defined in the copending application, Serial No. 463,101, filed October 23, 1942, now Patent No. 2,398,404 has score lines 8 which divide the blank into the four panels which form the flat sides of the body. At the opposite end of the blank are horizontal score lines 9 along which the blank is bent and folded to form end-closure supporting shoulders 10. The manner in which these shoulders are formed is illustrated and claimed in the aforesaid copending application.

Figure 4:
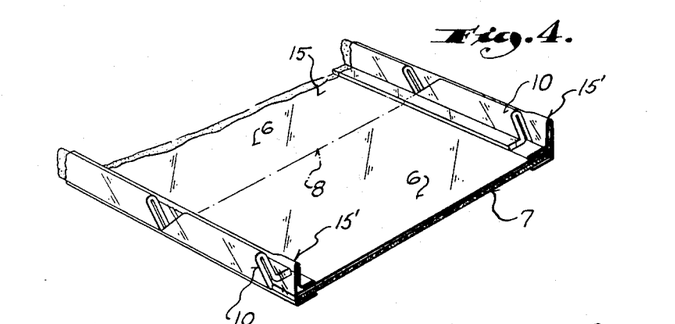
Figure 4 is a perspective view illustrating the body forming blank partially formed up to provide end-closure supporting shoulders and reinforcing flanges.

While the specific formation of the shoulders per se forms no part of this invention, it must be noted that in the formation of the shoulders holes 9' are cut into the blank to form notches in the shoulders at the score lines 8, see Figure 4. These notches allow folding the blank on the corner score lines 8 with the shoulders providing horizontal flanges to which the surfaces of end closures 11 and 12 may be adhered.

After the blank is formed up the shoulders reinforce the flat side walls of the body against inward deflection so that pressure may be applied to flanges 13 and 14 on the end closures to adhere them to the sides of the container.

Before the body blank 7 is formed up but after it has been scored, notched and cut out as required, a sheet of suitable lining material 15 is adhered thereto. If Pliofilm or a similar material is employed the adhesion or bonding of the sheet 15 to the blank 7 may be accomplished without the use of an adhesive merely by the application of heat and pressure.

Figure 3:
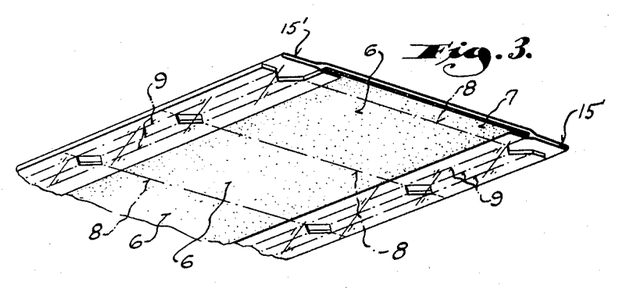
Figure 3 is a perspective view illustrating the manner in which the lining sheet is applied to the body forming blank.
Figure 6:
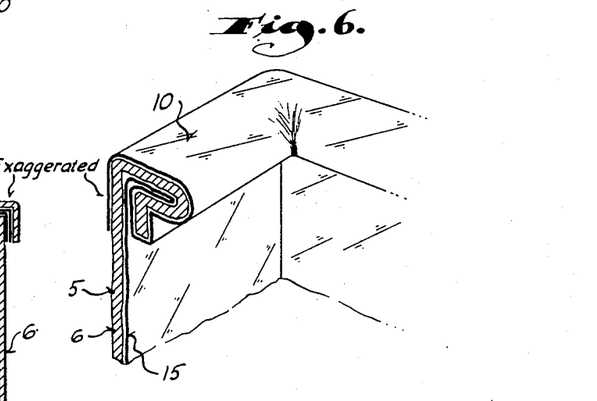
Figure 6 is a detail perspective view illustrating one corner of the container and showing the manner in which the lining material covers all portions of the body.
Figures 7, 8, 20:
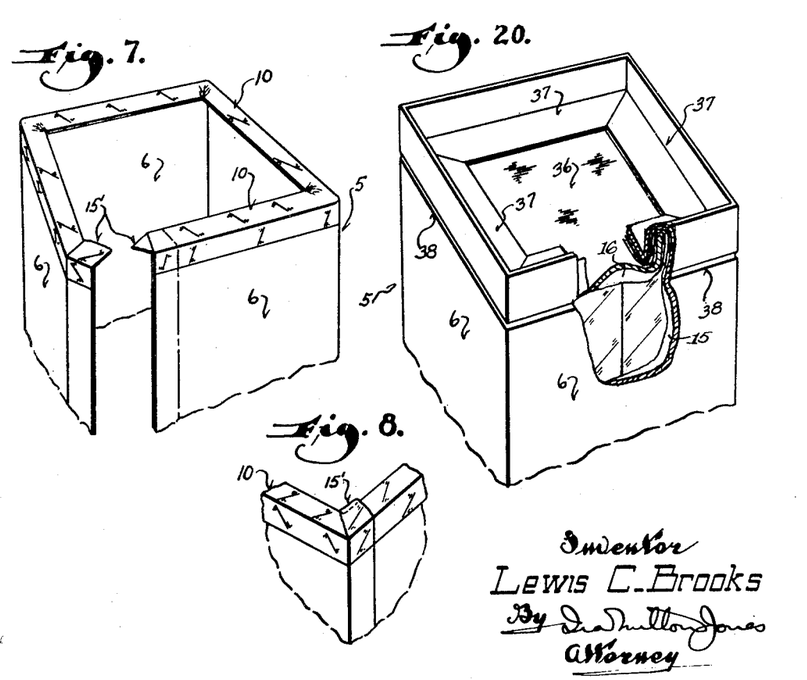
Figure 7 is a perspective view showing one end portion of the body about to be formed into a tube.
Figure 8 is a perspective view of the same end portion of the body after its formation into a tube.
Figure 20 is a perspective view showing an end portion of a container made with the body blank of Figure 19, said view having a part thereof broken away and in section to illustrate the detail of the juncture between its end closures and body.

It is to be noted that the sheet 15 is considerably larger than the blank 7 and that it overlaps the end edges and one side thereof. These overlapping portions of the sheet are folded over the edges of the blank as illustrated in Figure 3 with the overlap extending far enough so that after the end edges of the body blank are bent and folded to provide the shoulders 10, all portions thereof are covered by the lining as illustrated in Figures 4, 6 and 8.

Attention is particularly directed to the fact that the lining completely covers the notches in the shoulders resulting from the holes 9', and that when the blank is formed up into the tubular body the lining material extending across the notches is merely crowded together but not broken.

In this manner all the corners with the exception of the one adjacent to the vertical glue flap are fully protected from contact with the contents of the container. At this remaining corner equal protection is obtained by virtue of the fact that the liner is carried out to the very edge of the vertical glue flap. This results in an excess of stock 15' (Figures 3, 4, 7 and 8) of double thickness when the lining is folded around and over the top and bottom edges of the blank.

After the shoulders are formed up as shown in Figure 4, these double thickness portions of excess stock 15' are collapsed or flattened to seal in the ends of the shoulders; and after the tube is formed by adhering the vertical glue flap, these portions of excess stock 15' are in position to be folded over the shoulder on the fourth panel, i. e., the panel to which the glue flap is adhered, which may take place during the application of the end closures. Thus when completed, not only are the ends of the shoulders sealed in against contact with the container contents, but also all possibilities of leaving pin point openings in the joint at these corners are eliminated.

Figure 5:
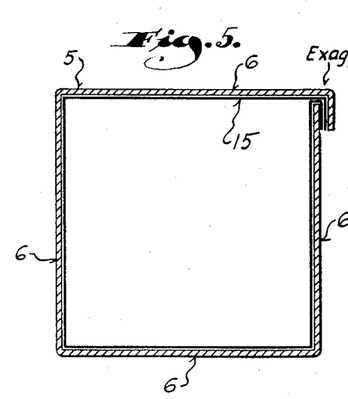
Figure 5 is a cross sectional view through the container, taken on the plane of the line 5—5 in Figure 1.

The overlap at one side of the blank assures the continuance of the lining throughout the area of the junction between the glue flap and the adjacent panel after the body blank is formed up to its tubular shape as shown in Figure 5.

Hence, the contents of the container cannot contact any part of the body material.

Figure 1:
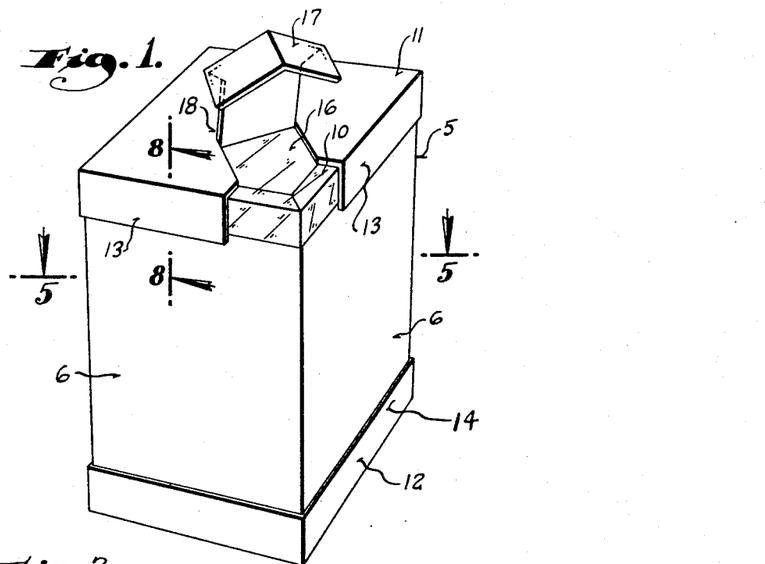
Figure 1 is a perspective view of a fiber container embodying this invention and illustrating one manner of providing a replaceable cap or cover to protect the contents after the seal has been broken.

Various types of end closures can be employed, but it is preferable that the closures have flanges or surfaces overlying the walls of the container, especially in cases where the closure supporting shoulders 10 are omitted. With the construction of the body as employed in the container shown in Figure 1 where the end-closure supporting shoulders are directed inwardly, the end closures are preferably in the form of slip covers or caps covering the ends of the body with the flat surfaces thereof resting on the shoulders 10 and their flanges adhered to the side walls of the body. This provides a wide bonding surface, and to insure the necessary stretch and elasticity for perfect bonding between the end closures and the body, the end closures are not pre-formed, that is, their flanges are not joined at the corners prior to application of the closures to the body.

Figure 9:
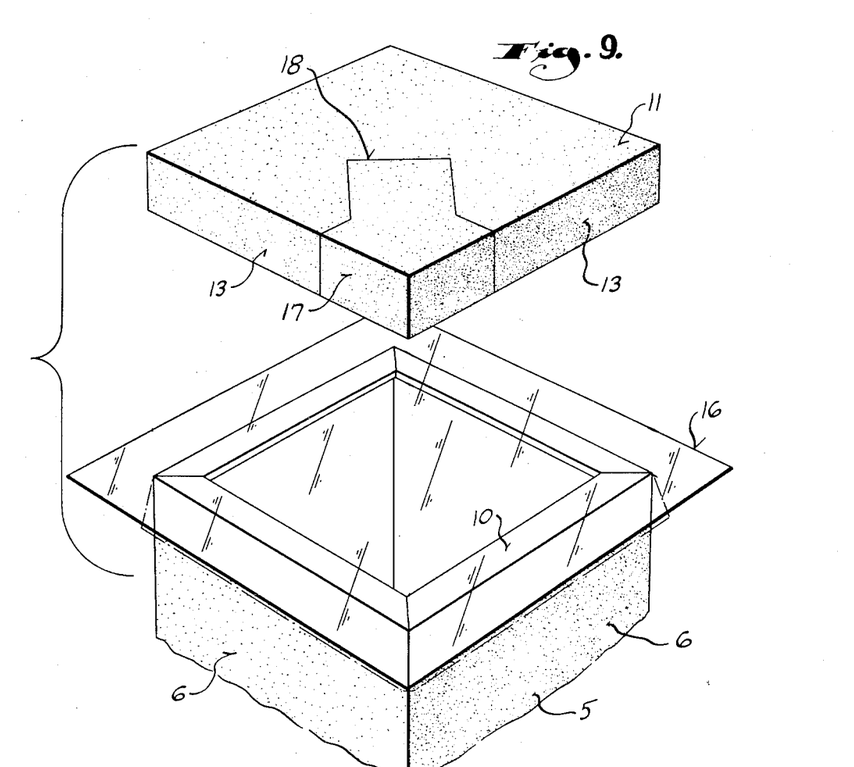
Figure 9 is a perspective view illustrating the top of the container body and an end closure cap about to be applied thereto with the end seal therebetween.
Figure 10:
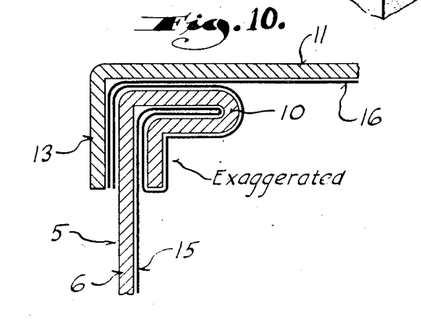
Figure 10 is an enlarged detail cross sectional view taken through Figure 1 on the plane of the line 8—8.

In the application of the end closures a sealing sheet 16 is interposed between the end of the body and the cap as shown in Figure 9. This sheet may be of the same material as employed for the lining of the body or it may be of any other suitable material, but as will be readily apparent it must be impervious to the product for which the container is intended. It covers the entire open end of the body and extends a substantial distance therebeyond as one continuous unbroken sheet at the corners as well as at the rest thereof and in practice is adhered to the end closure after cutting and scoring of the same.

Thus, in the application of the end closure the edge portions of the sheet 16 are folded over the edges of the body to be confined between the outer faces of the body and the inner faces of the flanges on the end closure or cap, and it is particularly noted that the corners of the sheet 16 are crowded into the corners of the cap so that all portions of the junction between the cap and body are completely filled with the lining material and no part of the cap or body can in anywise come in contact with the contents of the container.

To insure the desired hermetically sealed junction, a suitable adhesive and pressure is required. If the lining material is Pliofilm or the like, heat accompanying the pressure obviates the use of an adhesive, as Pliofilm may be vulcanized; but where Pliofilm or a similar vulcanizable material which is sensitive to direct heat application is employed, it is preferably covered with a lining of Cellophane or other material which requires no protection against direct application of heat. By direct heat application is meant the application of heat by means of metal pressure tools.

Another method is to apply the heat to the essential parts before they reach the tools that effect the bonding of the closure to the body. When this method is used it is not necessary to use heat in the tools as the cold tools effect a quick "set" to the hot plastic condition of the parts.

To enable the application of the required pressure, the end of the body, of course, must be strong enough to withstand the same. Hence, it will be seen that the particular formation of the mouth of the body, that is, the provision of the end-closure supporting shoulders, coacts with the manner of interposing the lining sheets 16 to obtain the desired hermetically tight seal.

One of the caps may be provided with a flap 17 hinged as at 18 to the surface of the cap. In this manner access may be quickly had to the container contents by lifting the hinged flap and puncturing the seal 16 while at the same time the contents of the container may be protected by reclosure of the hinged flap.

In the absence of a special cover member such as the hinged flap 17, the entire cap may be removed by a suitable cutting tool.

Figure 11:
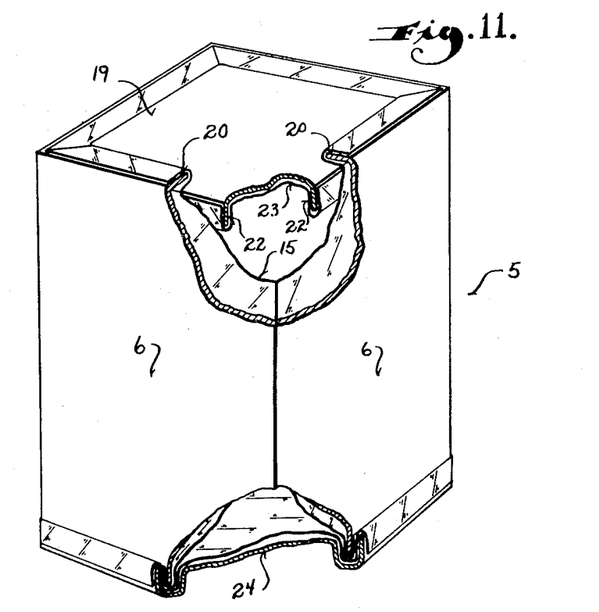
Figure 11 is a perspective view of another type of fiber container embodying this invention.
Figure 12:
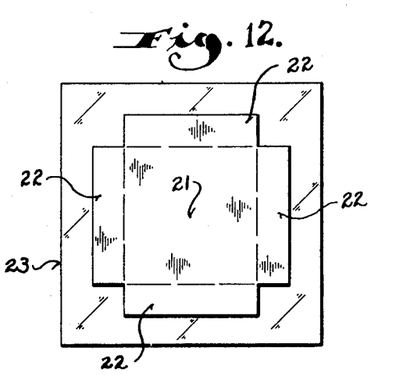
Figure 12 is a plan view of the top or upper end closure for the container shown in Figure 11 but illustrating the same prior to its being formed up and showing the end seal in position thereon.

As will be apparent to those skilled in the art, the specific form and construction of the containers made in accordance with this invention may vary with the character of the goods. For instance, the container shown in Figure 11 differs from that shown in Figure 1 as to the manner of securing the end closures to the body. In this case the top end closure 19 consists of a flat disc 21 with flanges 22 directed perpendicularly therefrom. After scoring of the blank from which the closure 19 is formed as shown in Figure 12, a lining sheet 23 of suitable material is adhered to the inner surface of the blank and its marginal edges folded over the edges of the flaps 22.

Attention is directed to the fact that the corners of the sheet 23 are uncut and are merely lapped over each other during the application of the lining sheet to the closure blank.

In applying the end closure 19 it is inserted into the open end of the body before the opposite or bottom end closure 24 is applied so that a mandrel may be readily inserted into the body to support the flanges 22 during the application of the pressure required to adhere the flanges to the sides of the body.

Attention is directed to the fact that by virtue of the square flat-sided formation of the container, the necessary stretch is readily obtained in the end closure to insure the formation of a hermetically sealed junction about the entire perimeter of the closure without in anywise stressing the same. This would hardly be possible with a round closure.

Further reinforcement of the junction between the top closure 19 and the body is provided by folding flanges 20 on the upper end of the body over the top of the closure and adhering the same thereto. This latter function may be performed at the same time the flanges of the closure are adhered to the side walls of the body.

Figure 13:
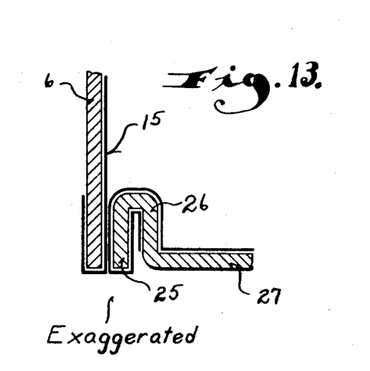
Figure 13 is a cross sectional view illustrating a slightly modified end seal.

After the top closure 19 is secured in place and the container filled, the bottom closure 24 is applied. This bottom closure may be a duplicate of the closure 19 and is readily secured in place from the exterior inasmuch as the flanges on the cap point downwardly or outwardly. Maximum strength and security against leakage is obtained by folding the closure flanges over the body side walls and adhering them in place.

Where it is desired to have the bottom of the container flush with the bottom edges of the body, a construction like that illustrated in Figure 13 may be employed. As here shown, the flanges 25 of the end closure, which are adhered to the side walls of the body, have a reverse bend 26 so that the closure disc 27 may be on the same plane as the lower edges of the body.

The space between the flanges 25 and 26 allows for the insertion of a tool during the application of sealing pressure on the juncture between the end closures and body side walls.

Figure 14:
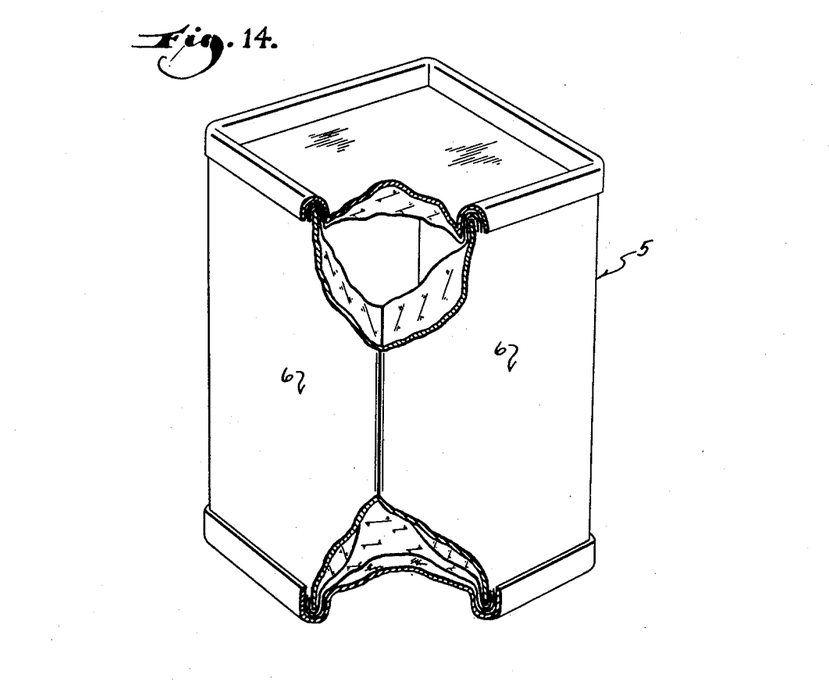
Figure 14 is a perspective view of a container constructed in accordance with this invention and especially designed for consumer sales of oil.

The container illustrated in Figure 14 has been found to be especially suitable for use with oil. In this construction the top and bottom ends of the body are straight, that is, they do not have closure supporting shoulders or reinforcing flanges as the formation of the end closures affords adequate rigidity and security against leakage. Both top and bottom closures in this case are like the bottom closure 24 of the container shown in Figure 11 wherein the flanges of the end closure are folded over the edges of the side walls. This construction allows both end closures to be applied from the outside.

Figure 15:
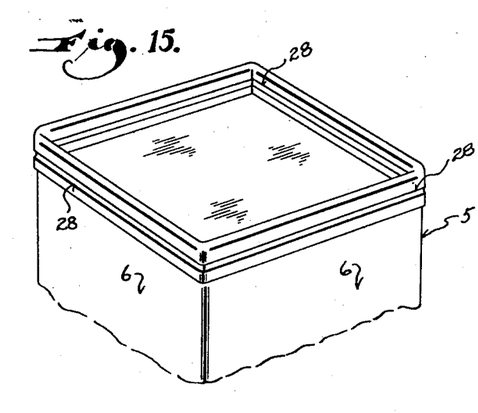
Figure 15 is a perspective view of one end portion of a container like that shown in Figure 14 but illustrating another manner of joining the closure to the body.

If desired, the flanges at the ends of the container shown in Figure 14 and described above may have one or more beads or grooves 28 formed therein as shown in Figure 15 to increase the tightness of the junction between the end closure flanges and the body side walls.

Figures 16, 17, 18:
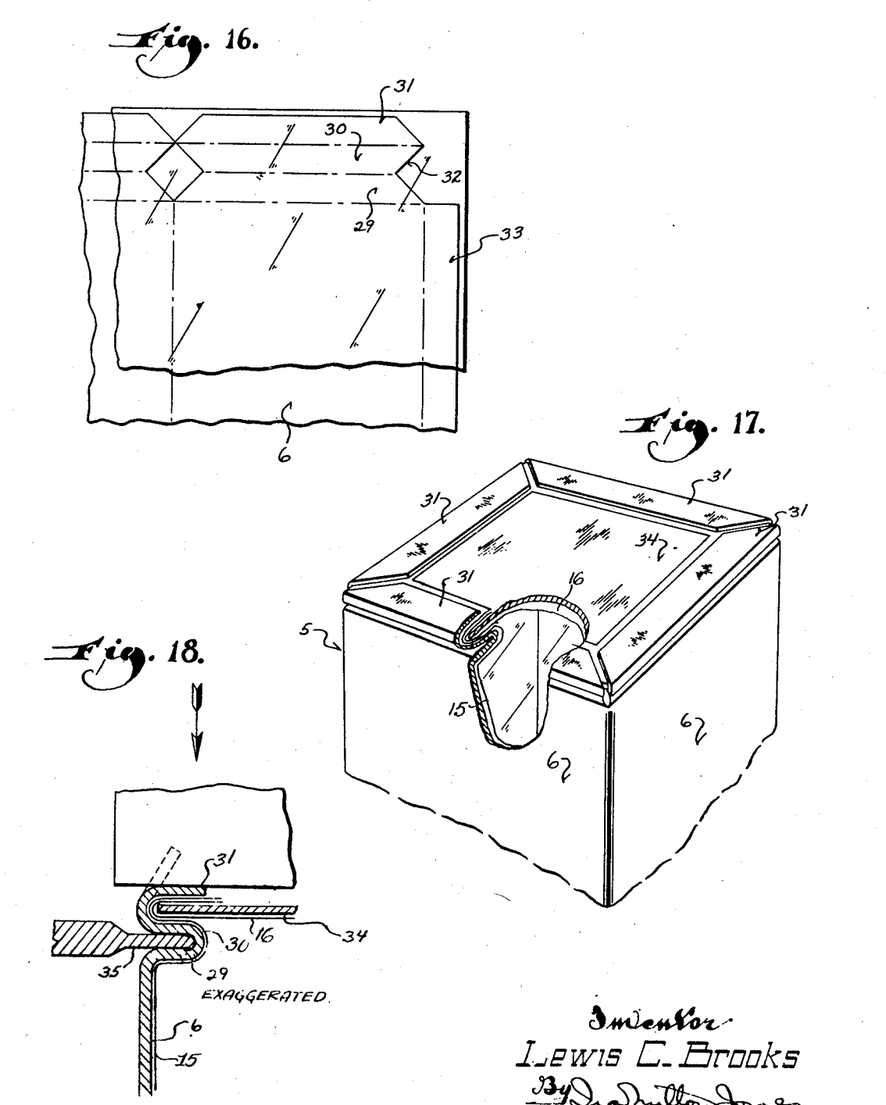
Figure 16 is a plan view of part of the body blank (with its liner) employed in the formation of the container shown in Figure 17.
Figure 17 is a perspective view showing one end portion of a container made with the body blank shown in Figure 16 and having a part thereof broken away to illustrate the detail of the juncture between its end closures and body.
Figure 18 is a view diagrammatically illustrating the manner in which the closure is attached in this container.

Another manner of attaching the end closures to the body is illustrated in Figures 16, 17 and 18. In this instance the ends of the blank have three flange forming strips 29, 30 and 31 defined by score lines, and these strips are cut out at the corners as at 32 to enable the flanges to be folded in, out, and back in again. The lining 33 is applied to the body in the same way as before and extends across the holes formed in the corner portions of the strips.

The end closure consists merely of a flat square disc 34 having a liner applied thereto and extending around the edges of the disc.

The manner of securing the end closure wholly from the outside is as shown in Figure 18 wherein a blade-like support 35 is shown inserted in the fold between the flanges 29 and 30 while pressure is applied to the flange 31.

Figure 19:
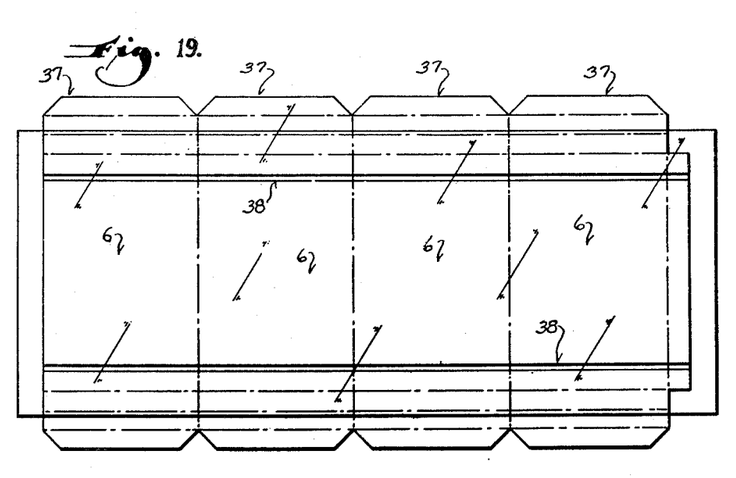
Figure 19 is a plan view of the body blank and its liner of the container shown in Figure 20.

Still another construction especially suitable for oil is shown in Figures 19 and 20. The construction illustrated in these views greatly strengthens the closure and affords exceptional protection from outside blows. In this case the cap 36 telescopes into the end of the body and flaps 37 on the ends of the side walls fold over the flanges of the cap to have their extremities adhered to the outside of the cap. In the disclosure of this form of the invention in Figure 20, the liner has not been illustrated, but it is to be understood that the body and cap are lined with a suitable sheet material as before.

It is to be observed that the body has an indented bead 38 extending around the same to define the depth to which the cap may be inserted and to also form a guide for a rotary or other knife used to sever the top from the container, especially when it is used for lubricating oil.

From the foregoing description, taken in connection with the accompanying drawing, it will be readily apparent to those skilled in the art, that the secret of this invention lies in so fabricating the component parts of the container and assembling them with the lining that all inner surfaces as well as the junctures between the end closures and the body have an unbroken covering of the lining, and that as long as these requirements are met many variations in the specific construction of the body and the end closures may be employed without deviating from the invention.

What I claim as my invention is:

1. In a hermetically sealed fiber container of the character described: a flat sided body having sharply defined angular corners; a closure supporting ledge on one end of the body, said ledge comprising a plurality of adjacent strips extending horizontally along said end of the body side walls, said strips being an integral part of the body side walls and being folded on each other so as to dispose at least one of the strips substantially perpendicular to the side walls to define the ledge proper while another strip lies flat against the side walls; a lining of thin sheet material impervious to the product for which the container is intended covering all inner surfaces of the body and all surfaces of said strips, both inner and outer, and being unbroken at the corners of the ledge formed by the strips so as to protect all parts of the body against contact with the contents, and an end closure supported on the ledge including a lining of thin sheet material impervious to the product for which the container is intended, adhered to the ledge and covering all inner surfaces of the closure.

2. In a hermetically sealed fiber container of the character described: a tubular body formed from a single blank of fiber board and having flat sides and angular corners; a reinforcing end closure supporting ledge extending around the body at one end thereof and comprising a plurality of strips integral with the side walls of the body and defined therefrom by score lines extending across the entire blank from which the body is formed transversely to the score lines defining the side walls of the body from each other so that said strips extend about the perimeter of the body, the outermost of said strips which is formed by an edge portion of the blank being unbroken for its entire length, and at least one of the inner strips being cut adjacent to the corners of the body to facilitate folding of the ledge formed by the strips around the corners of the body with the outer surfaces of the ledge flush with the end of the body and perpendicular to its side walls, and its unbroken strip extending around at least all but one corner of the body and secured to the side walls thereof; a lining of thin sheet material impervious to the product for which the container is intended covering all inner surfaces of the body and folded over said ledge forming strips to the exterior of the body and adhered to the side walls of the body at the exterior of the container so as to completely envelope said strips and their cut-out portions, said lining being unbroken at the corners of the ledge formed by the strips so as to protect all parts of the body against contact with the contents; and an end closure supported on the ledge and including a lining of thin sheet material impervious to the product for which the container is intended covering all inner surfaces of the closure and adhered to the ledge so as to provide a lining to lining seal thereat.

3. In a hermetically sealed fiber container of the character described: a tubular body formed from a single blank of fiber board and having flat sides and angular corners; an end closure supporting ledge extending inwardly around one end of the body substantially flush with said end of the body, said ledge comprising a plurality of strips integral with the side walls of the body and defined therefrom by score lines extending across the entire blank from which the body is formed transversely to the score lines defining the side walls of the body from each other so that said strips extend about the perimeter of the body, at least one of said strips being cut adjacent to the corners of the body to facilitate folding the ledge formed by the strips around the corners of the body with the outer surfaces of the ledge substantially flush with the end of the body and perpendicular to its side walls; a lining of thin sheet material impervious to the product for which the container is intended covering all inner surfaces of the body and folded around and over said ledge forming strips to the exterior of the body and adhered to the side walls of the body adjacent to said end thereof so as to completely envelope said ledge forming strips and enclose the cut-out portions thereof, said lining being unbroken at the corners of the ledge so as to protect all parts of the body against contact with the contents; and an end closure supported on said ledge having a flange thereon substantially telescoped over said end of the body, said closure including a lining of thin sheet material impervious to the product for which the container is intended covering all inner surfaces of the end closure and said flange and adhered to the body lining covering said ledge and to the lining at the exterior of the body at said end thereof so as to provide a lining to lining seal both on the interior and exterior of the container.

LEWIS C. BROOKS.

REFERENCES CITED

The following references are of record in the file of this patent:

UNITED STATES PATENTS

| Number | Name | Date |
|---|---|---|
| 2,141,499 | Williams | Dec. 27, 1938 |
| 2,160,072 | Karl | May 30, 1939 |
| 2,121,667 | Kittredge et al. | June 21, 1938 |
| 2,200,200 | Donnelly | May 7, 1940 |
| 2,241,710 | Lowey | May 13, 1941 |
| 2,173,585 | Harrison | Sept. 19, 1939 |
| 2,106,733 | Harrison | Feb. 1, 1938 |
| 2,227,138 | Karl | Dec. 31, 1940 |
| 2,325,922 | Sebell | Aug. 3, 1943 |
| 1,956,159 | Reilly | Apr. 24, 1934 |
| 2,353,178 | Moore | July 11, 1944 |